(12) United States Patent
Timlick

(10) Patent No.: US 12,291,882 B2
(45) Date of Patent: May 6, 2025

(54) LEVEL-BY-LEVEL 3D PRINTING OF MULTI-LEVEL STRUCTURES USING REMOVABLE CABLE-SUPPORT MASTS AND A CABLE-GUIDED NOZZLE

(71) Applicant: Brian C. Timlick, Winnipeg (CA)

(72) Inventor: Brian C. Timlick, Winnipeg (CA)

( * ) Notice: Subject to any disclaimer, the term of this patent is extended or adjusted under 35 U.S.C. 154(b) by 263 days.

(21) Appl. No.: 17/733,213

(22) Filed: Apr. 29, 2022

(65) Prior Publication Data

US 2023/0349176 A1 Nov. 2, 2023

(51) Int. Cl.
| | | |
|---|---|---|
| *E04G 21/04* | (2006.01) | |
| *B29C 64/209* | (2017.01) | |
| *B29C 64/227* | (2017.01) | |
| *B33Y 10/00* | (2015.01) | |
| *B33Y 30/00* | (2015.01) | |

(52) U.S. Cl.
CPC ..... *E04G 21/0445* (2013.01); *E04G 21/0427* (2013.01); *E04G 21/0472* (2013.01); *B29C 64/209* (2017.08); *B29C 64/227* (2017.08); *B33Y 10/00* (2014.12); *B33Y 30/00* (2014.12)

(58) Field of Classification Search
None
See application file for complete search history.

(56) References Cited

U.S. PATENT DOCUMENTS

| | | | |
|---|---|---|---|
| 11,213,973 B2 | 1/2022 | Tinari | |
| 11,230,032 B2 | 1/2022 | Post et al. | |
| 11,254,027 B2 | 2/2022 | Tinari | |
| 2015/0300036 A1* | 10/2015 | Khoshnevis | ........ E04G 21/0463 |
| | | | 425/63 |
| 2019/0315016 A1* | 10/2019 | Post | ......................... E04B 1/35 |

FOREIGN PATENT DOCUMENTS

CN 108868141 A * 11/2018

* cited by examiner

*Primary Examiner* — Matthew J Daniels
*Assistant Examiner* — Xinwen Ye
(74) *Attorney, Agent, or Firm* — Kyle R. Satterthwaite; Ade & Company Inc.; Ryan W. Dupuis

(57) ABSTRACT

A 3D printing system for 3D printing of concrete buildings or other concrete structures. A set of cable support masts are temporarily installed at corners of a two-dimensional footprint area of any given level of a multi-level building to enable 3D printing of wall sections or other structural components of that given level of the building using a cable-guided concrete dispensing nozzle suspended from said cable support masts by a set of movable, motor-driven positioning cables. The building is built in stage-wise fashion, level-by-level, with the set of support masts being moved up level-by-level as the levels of the building are completed. The construction of the building is not dependent on a set of ground-level towers distributed around the ground-level footprint of the building, thus notably reducing equipment requirements for the 3D printed construction of tall, multi-storey buildings.

20 Claims, 6 Drawing Sheets

LEVEL-BY-LEVEL 3D PRINTING OF MULTI-LEVEL STRUCTURES USING REMOVABLE CABLE-SUPPORT MASTS AND A CABLE-GUIDED NOZZLE

FIELD OF THE INVENTION

This application relates generally to the field of three-dimensional (3D) printing, and more particularly to use of 3D printing to produce concrete structures.

BACKGROUND

Recently, a number of U.S. patents have been granted concerning the construction of concrete buildings using a concrete-dispensing nozzle whose position in 3D space overtop of the intended building footprint is controlled via a plurality of positioning cables running from a plurality of towers setup around the building footprint area. Examples of such patents include U.S. Pat. Nos. 11,213,973 and 11,254,027 issued to Tinari 3D Inc. of Coquitlam, British Columbia, Canada, and U.S. Pat. No. 11,230,032 issued to UT-Battelle, LLC of Oak Ridge, Tennessee, U.S.A., each of which is incorporated herein by reference in its entirety.

A notable limitation of the equipment setup and procedure disclosed in these prior patents is that the elevation to which a building can be constructed is constrained by the achievable heights of the erected towers from which the dispensing nozzle is suspended and controlled by the associated positioning cables spanning from those towers. Framed another way, construction of notably tall buildings or structures requires intensive elevational capabilities of the ground-level towers needed for the cable-guided movement of the nozzle.

Accordingly, there remains room for improved and alternative equipment and methodologies for 3D printing of concrete buildings or structures, particular for those of significant height.

SUMMARY OF THE INVENTION

According to one aspect of the invention, there is provided a method of building a multi-level structure at least partly by way of three-dimensional (3D) printing using a cable-guided nozzle, said method comprising gradually constructing said multi-level structure level-by-level in a plurality of stages, during which at least one stage comprises building an additional level of said structure atop one or more previously built levels of said structure by:
  (a) installing a set of cable support masts in a manner supported on the one or more previously built levels of said structure, and in positions where cable-emergence points of the masts reside outwardly of a two-dimensional footprint to be occupied by the additional level; and
  (b) with said cable-guided nozzle in a suspended state controllingly movable by a plurality of positioning cables spanning from the cable-emergence points of said cable support masts to said cable-guided nozzle, 3D printing at least part of said current level of the structure onto said one or more previously built levels using said cable-guided nozzle.

According to another aspect of the invention, there is provided a cable apparatus for cable-based support and control of a cable-guided nozzle in a three-dimensional printing system for printing multi-level structures, said cable apparatus comprising:

a base;
  a cable support mast carried by said base;
  a cable emergence point on said mast at a location of both vertically elevated and outwardly spaced relation to said base;
  a motorized cable winder operable to selectively deploy and retract a positioning cable therefrom and thereto with said positioning cable routed from said motorized cable winder to said cable emergence point, from which said cable is extendable away from the mast for connection to the cable-guided nozzle for cable-guided movement thereof via operation of the motorized cable winder;
  wherein said cable apparatus is further characterized by at least one of the following features:
  (a) said base is L-shaped;
  (b) the apparatus further comprises one or more anchor members depend downwardly from said base for insertion into hollow cavities of a supportive element onto which the base is seated for temporary support during use;
  (c) the support mast is supported in outwardly cantilevered relation from, the base; and/or
  (d) the support mast is supported on the base via a swivel for selective movement of the support mast about a swivel axis thereof to enable positional adjustment of the support mast relative to the base about said swivel axis.

According to yet another aspect of the invention, there is provided a cable system for cable-based control of a cable-guided nozzle in a three-dimensional printing system for printing multi-level structures, said cable system comprising four of the cable apparatus of the preceding aspect of the invention for installation at four respective corners of a two-dimensional footprint of any given level of a multi-level structure during building thereof.

BRIEF DESCRIPTION OF THE DRAWINGS

Preferred, but non-limiting, embodiments of the invention will now be described in conjunction with the accompanying drawings in which.

DETAILED DESCRIPTION

A 3D printing system of the present invention for 3D printing of concrete buildings or other concrete structures includes a set of four cable support masts for temporary installation at four respective corners of a two-dimensional rectangular footprint area of any given level (e.g. storey) of a multi-level (e.g. multi-storey) building to enable 3D printing of wall sections or other structural components of that given level of the building using a cable-guided concrete dispensing nozzle that is suspended from said cable support masts by a set of movable, motor-driven positioning cables. The building is built in stage-wise fashion, level-by-level, with the set of support masts being moved up level-by-level as the levels of the building are completed, whereby the construction of the building is no longer constrained by the achievable elevations reachable by a set of ground-level towers erected at ground-level positions distributed around the ground-level footprint of the building.

Figure 1A:
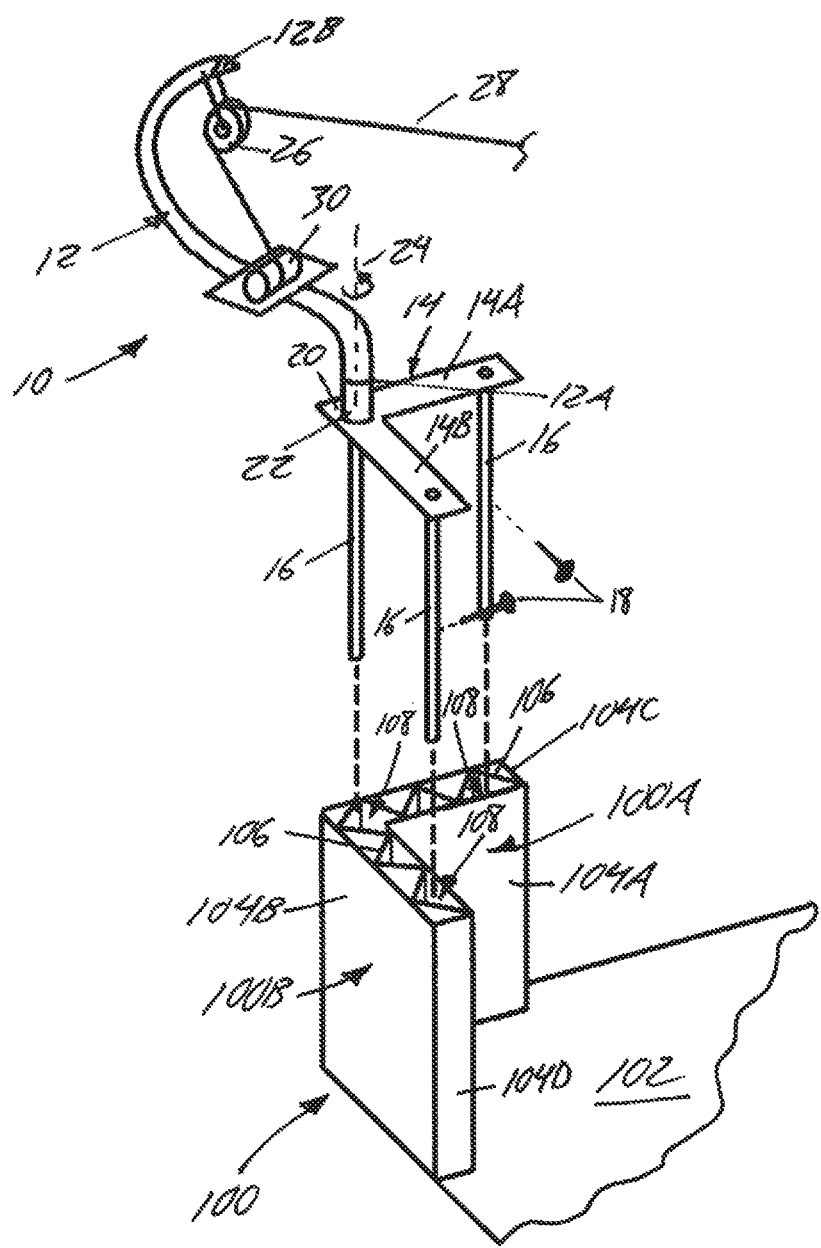
FIG. 1A is an exploded perspective view illustrating temporary placement of a removable cable support mast of a 3D printing system on an initially erected corner wall-section of an incomplete first-level perimeter wall of a building, completion of which is to be achieved by 3D printing remaining inter-corner sections of said first-level perimeter wall.
Figure 1B:
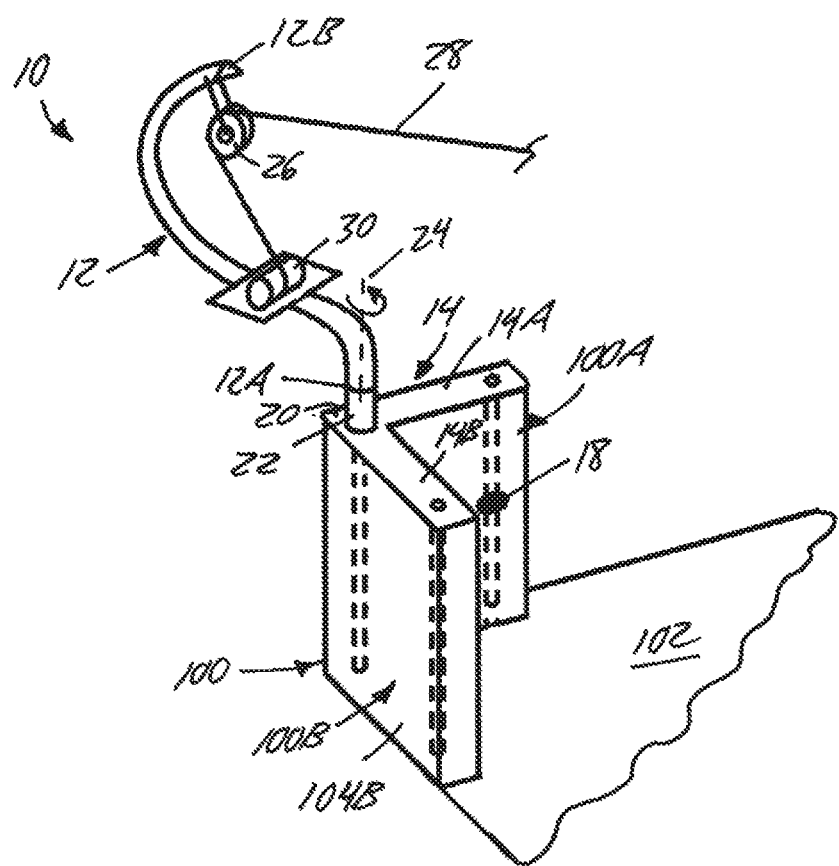
FIG. 1B is another perspective view of the cable support mast and corner wall-section of FIG. 1, with the cable support mast placed in a mounted position atop the corner wall-section.

FIG. 1A illustrates one of the system's cable support masts 10, and demonstrates temporary placement thereof atop an initially erected corner wall-section 100 of an incomplete first-level perimeter wall of a building. The corner wall-section 100 resides at a corner of a two-dimensional footprint area 102 of the building's first level, all perimeter sides of which will be occupied by the first-level perimeter wall of the building once completed. The illustrated embodiment concerns a square or rectangular building with a square or rectangular footprint area 102 having four sides, among which each pair of intersecting sides intersect at ninety degrees to one another. The illustrated building has a matching square or rectangular perimeter wall at each subsequent level that likewise has four sides each occupying a respective side of a matching footprint area 102 of that subsequent level. In the case of the first level of the building, the two-dimensional footprint area 102 may be occupied by a concrete foundation of the building.

In the square/rectangular footprint context of the illustrated embodiment, each corner wall-section 100 is L-shaped in horizontal cross-section, having first and second legs 100A, 100B that lie at a right angle to one another and run horizontally along a respective pair of intersecting perimeter sides of the two-dimensional footprint area 102. In the first illustrated example, each corner wall-section 100 is a 3D printed concrete wall section composed of a concrete interior skin 104A facing inwardly over the footprint area 102 (i.e. toward an interior of the finished building, once complete), an opposing concrete exterior skin 104B facing outwardly away from the footprint area 102 (i.e. toward the exterior of the finished building, once complete), first and second concrete end skins 104C, 104D each capping off an outer end of a respective leg 100A, 100B of the corner wall-section 100, and thus spanning between the interior and exterior skins 104A, 104B, and finally, internal webbing 106 that resides within an overall outer envelope of the wall section that is formed by the interconnected skins 104A-104D. The internal webbing 106 interconnects the internal surfaces of the various skins to one another at discretely spaced intervals to impart rigidity to the outer envelope of the wall section. The illustrated example features a truss-like webbing topology that, viewed in any horizontal reference plane, follows a triangular or sinusoidal wave-like pattern alternating back and forth between the interior and exterior skins. Empty void cavities 108 reside within the wall-section's interior between the alternating spans of the webbing's truss-like topology. That being said, other types of internal webbing are also known in the art of 3D printed concrete walls (e.g. cellular, triangular, lattice topologies), and likewise leave internal voids or channels similarly usable in the context of the present invention.

Each cable support mast 10 features a mast pole 12, a base 14 on which the mast pole 12 is carried, and a plurality of anchor members 16 (e.g. elongated rods or studs) attached to the base and depending downwardly from an underside thereof at discretely spaced positions distributed over the surface area thereof. Except for the anchor members 16 hanging from the base 14, the underside of the base 14 is flat for flush seating thereof on a top end of the corner wall-section 100. In the illustrated example, the base 14 is embodied by an L-shaped plate having two wings 14A, 14B that diverge from one another at a right angle, are each similar in horizontal width and length to the two legs 100A, 10BB of the corner wall-section 100, whereby the base 14 occupies a substantial entirety of the corner wall-section's top end when seated thereon. That being said, the shape and size of the base 14 need not necessarily conform the those of the corner wall-section's top end to serve the intended purpose of supporting the mast 10 atop the corner wall-section 100. When the base 14 of the mast 10 is seated atop the corner wall section 100, the anchor members 16 hanging from the underside of the base 14 reach downwardly into a respective subset of the corner wall-section's void cavities 108, whereby the anchor members 16 serve to block displacement of the base 14 from off the top end of the corner wall-section 100.

To further anchor and stabilize the installed mast 10 in its mounted position atop the corner wall cavity 100, one or more fasteners 18 may be driven horizontally into at least a subset of the void-received anchor members 16 through one or more skins 104A-104D of the wall section's outer envelope. To enable later removal of the mast 10 from the corner wall-section 100 once the first-level perimeter wall is completed, the fasteners are preferably removable to enable extraction of the anchor members 16 from the void cavities 108 of the corner wall-section 100. Alternatively, the anchor members 16 may be sacrificial anchor members that are instead detachable from the base 14 at such time of mast removal, and are then left in place in their fastened state inside the void cavities of the corner wall section 100. Such sacrificial anchor members would be subsequently replaced with another set of sacrificial anchor members to enable remounting of the mast base 14 at the next level of the building's construction after completion of the first level's perimeter wall, as described herein further below. In the illustrated example, the mast 10 features three anchor members 16, of which two reside near distal ends of the base's two divergent wings 14A, 14B, and a third resides at a corner juncture 20 of the base 14 where the two divergent wings 14A, 14B meet one another. However, it will be appreciated that the particularly quantity and location of the anchor members 16 may be varied.

Optionally, the mast pole 12 may be attached to the base 14 via a swivel 22, by which the angular position/orientation of the mast pole 12 can varied about an upright swivel axis 24 of vertically orthogonal relationship to the horizontal plane of the flat base plate 14. In the first illustrated example, the mast pole 12 is not a straight, vertically-oriented pole, and instead has a non-linear shape, whose lowermost end 12A overlies the corner junction 20 of the base and is vertically coupled thereto by the swivel 22. A lower part of the non-linear mast pole 12 stands vertically upright a short distance from the swivel 22, and from this lower part, the mast pole 12 then turns laterally outward from the corner juncture 20 and swivel axis 24, then curves initially upwardly, before curving back over itself and inwardly toward the swivel axis 24 from which it originated, but at notably greater elevation than its swivel-attached lower end. At this greater elevation, the non-linear mast pole 12 terminates at an uppermost distal end 12B. In this example, the profile of the curved part of the mast pole 12 that spans outwardly from swivel-attached lower part and terminates at the elevated distal end 12B visually resembles a bass-clef symbol, with the concave side thereof facing inwardly toward the base 14, and thus toward the building's footprint area 102 at whose corner the installed support mast 10 resides atop the corner wall-section 100.

In the illustrated example, a pulley 26 is hung from a notably elevated point on the mast pole 12 near the distal end 12B thereof, and a respective positioning cable 28 of the 3D printing system is routed over this pulley 26 from a motorize cable winder 30 of the support mast 10, which in the illustrated example is mounted on the swivel-capable mast pole 12, as result of which is that regardless of a particularly occupied position/orientation of the mast pole 12 relative to the base 14 and swivel axis 24 at any given time, the pulley 26 and cable winder 30 reside in the same relative position and alignment to one another. In other variants, the cable winder 30 may alternatively be mounted elsewhere, for example on the base 14. The pulley 26 denotes a cable emergence point of the illustrated support mast 10, where the position cable 28 emanates from the support mast 10 to reach toward and connect to a concrete dispensing nozzle of the 3D printing system. Operation of the motorized cable winder 30 in a deployment direction plays out more of the positioning cable 28 therefrom to lengthen the cable's reach from the support mast 10. Opposing operation of the motorized cable winder in a retraction direction instead winds more of the positioning cable 28 back onto the winder 30 to shorten the cable's reach from the support mast, thereby pulling on the dispensing nozzle.

Figure 2A:
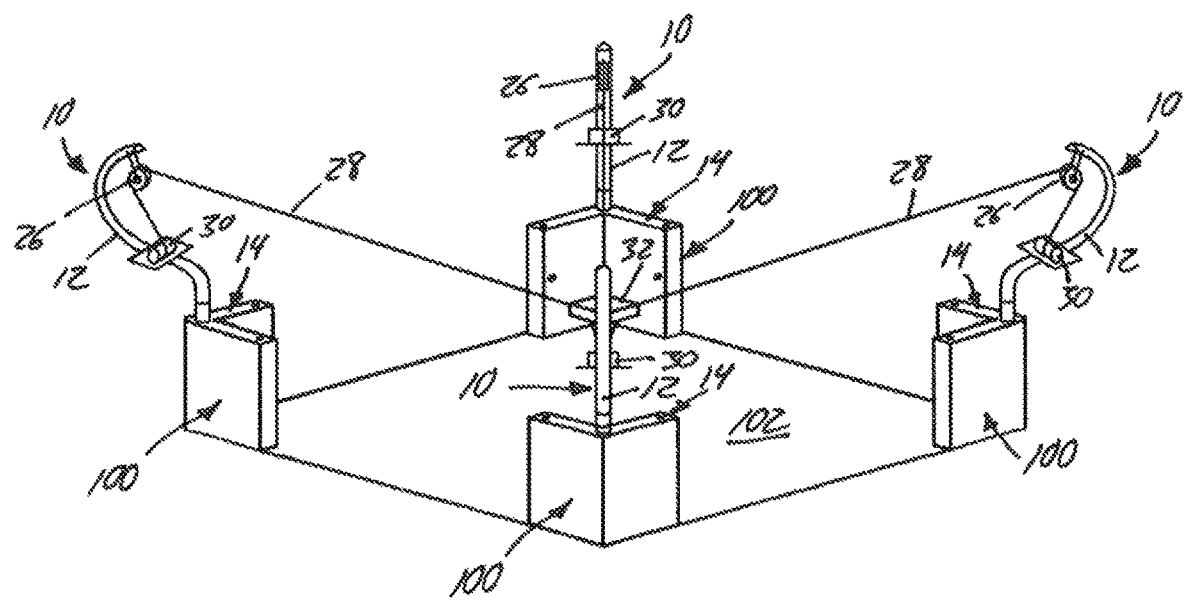
FIG. 2A is a perspective view showing four of the cable support masts in mounted positions atop four corner wall-sections of an incomplete first-level perimeter wall of a building.
Figure 2B:
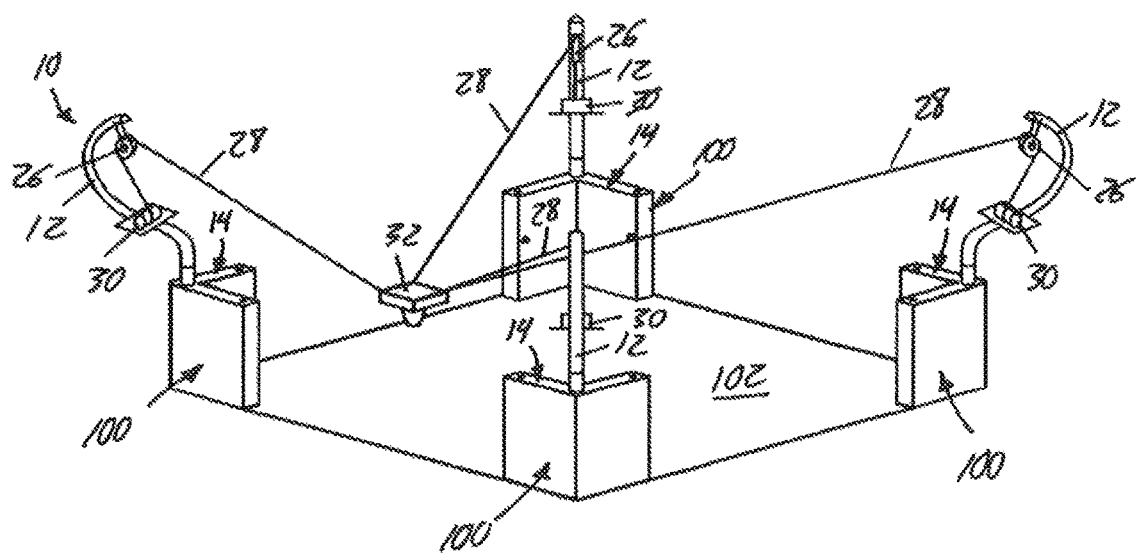
FIG. 2B shows the same four corner-mounted cable support masts of FIG. 2A, illustrating use of respective positioning cables thereof to perform controlled movement of a cable-guided concrete-dispensing nozzle.

Owing to the mast pole shape that cantilevers outwardly from the base 14 at the corner of the footprint area 102, the cable emergence pulley 26 is thus supported a position spaced horizontally outward from this respective corner of the footprint area. FIGS. 2A and 2B illustrate how four of these cable support masts 10 installed at the four corners of the first-level footprint area 102 of the building can be used to support, via their four respective positioning cables 28, a concrete dispensing nozzle 32. The nozzle 32 can be manoeuvred in three orthogonal directions (e.g. a vertical Z direction, and horizontal X and Y directions) in 3D space over an entirety of the footprint area 102 via deployment and retraction of the positioning cables 28 via electronically controlled operation of the motorized cable winders 30. The outwardly cantilevered mast poles 12 place the cable emergence pulleys 26 of the masts 10 horizontally outward from the outer perimeter of the building's footprint area 102, and the mounted state of the cable support masts 10 atop the initially erected corner wall-sections 100 places the cable emergence pulleys 26 at greater elevation than the top ends of these wall sections 100. The cable-guided concrete dispensing nozzle 32 can thus be used to 3D print first-level inter-corner wall sections spanning between the first-level corner wall sections 100 in order to complete a concrete first-level perimeter wall of the building+.

Figure 3A:
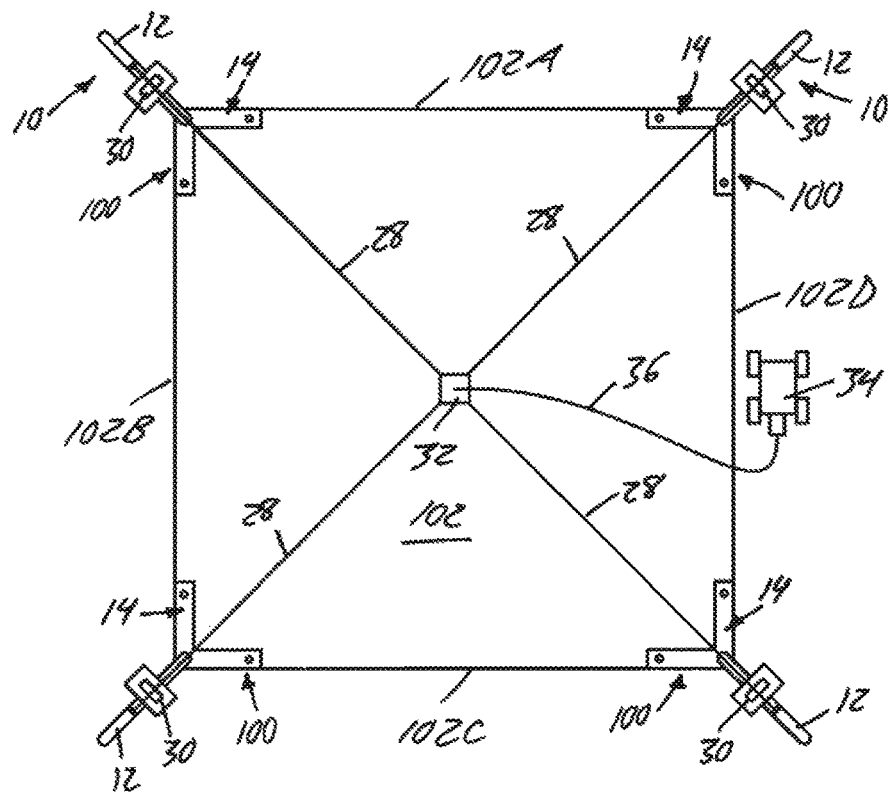
FIG. 3A is an overhead plan view of the same four corner-mounted cable support masts of FIG. 2A, in combination with a concrete pump and concrete supply conduit that are cooperatively operable to feed flowable concrete to the cable-guided dispensing nozzle.

FIG. 3A illustrates a starting point of the first-level wall printing stage of the building construction process, where all four cable support masts 10 are installed atop the four respective corner wall-sections 100 at the four corners of the first-level footprint area 102 of the building, as likewise shown in FIG. 2A. FIG. 3A differs from FIG. 2A in the schematically illustrated the addition of a concrete pump 34, from which a flexible concrete supply conduit 36 is routed to the cable-guided concrete dispensing nozzle 32 that is suspended over the footprint area 102 by the positioning cables 28 of the cable support masts 10. Through the supply conduit 36, the concrete pump 34 is operable to convey a flowable concrete mix to the nozzle 32 for disposition of such flowable concrete mix onto the footprint area 102 of the building in order to build structural concrete walls thereof in 3D printed fashion.

These pieces of equipment collectively denote the mechanical components of a complete and operational 3D printing system, of which cooperating electronic control componentry may be of the type disclosed in aforementioned U.S. Pat. No. 11,213,973, the entirety of which is incorporated herein by reference. In such case, the control componentry of the 3D printing system includes at least one computing system connected to the motorized cable winders 30 by wired or wireless connections, and a design file for the building being constructed, which is stored in non-transitory computer readable memory of the computing system, having optionally been uploaded to the computing system from an external computing device via wired or wireless connection, and optionally translated from an initial format (e.g. computer-aided drawing (CAD) format) to a more 3D-printing-compatible format (e.g. G-Code) usable by the computing system to accurately position the nozzle as the nozzle dispenses the flowable concrete mix at a steady rate. In a known manner, the nozzle moves and dispenses the concrete mix in successive layers according specifications and/or instructions (e.g., G-Code instructions) included to the design file.

Figure 3B:
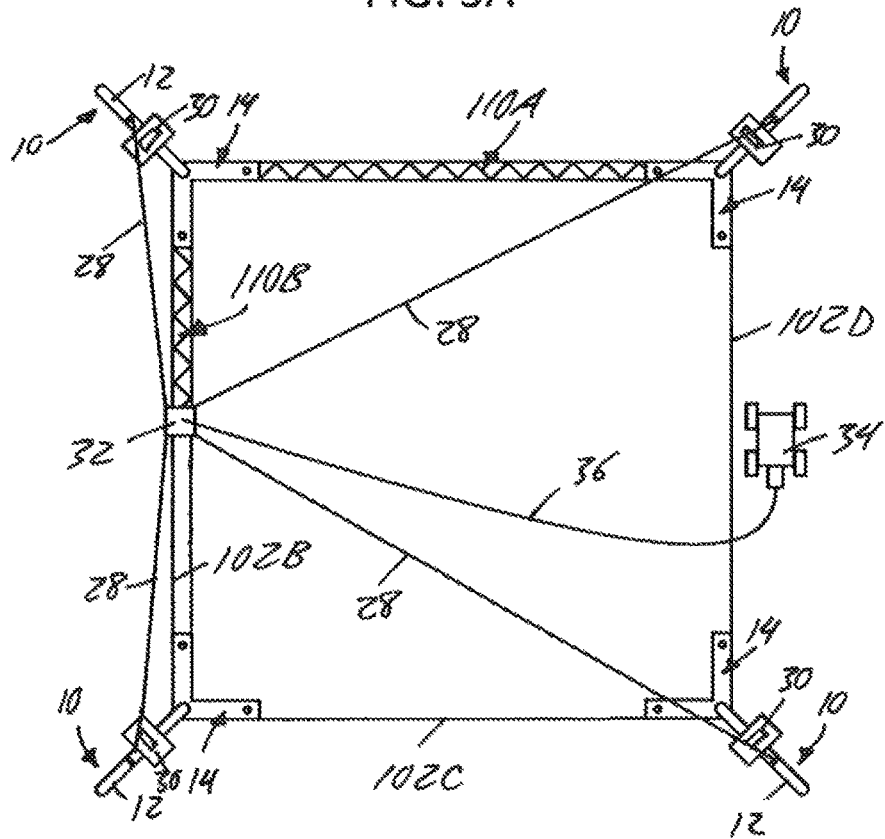
FIG. 3B is another overhead plan view of the 3D printing system of FIG. 3A during printing of the inter-corner wall sections of the first-level perimeter wall of the building.

FIG. 3B illustrated the 3D printing system of FIG. 3A at a point in time part way through the 3D printed completion of the first-level perimeter wall of the building. Here, a first inter-corner wall section 110A of the first-level perimeter wall has already been printed by the cable-guided nozzle 32 along a first side 102A of the first-level footprint area 102 of the building, with the resulting first inter-corner wall section 110A fully spanning the originally open gap between two of the initially erected corner wall-sections 100 of the first-level perimeter wall. Printed in successive layers of increasing elevation starting at the horizontal plane of the first-level footprint area 102, the topmost layer of the completed first inter-corner wall section 110A of the first-level perimeter wall of the building may reside flush with the top ends of the two corner wall-sections 100 between which it is printed. FIG. 3B also illustrates partially completed printing of a first layer of a second inter-corner wall section 110B of the first-level perimeter wall, as such second inter-corner wall section 110B is being printed by the cable-guided nozzle 32 along a second side 102B of the first-level footprint area 102. Once finished, this second inter-corner wall section 110B will fully span the originally open gap between another two of the initially erected corner wall-sections 100 of the first-level perimeter wall. In the illustrated instance, the outer envelope of first layer of the second inter-corner wall section 110B has already been printed, and the nozzle is shown to be subsequently printing the inner webbing of this inter-corner wall section 110B.

Figure 4A:
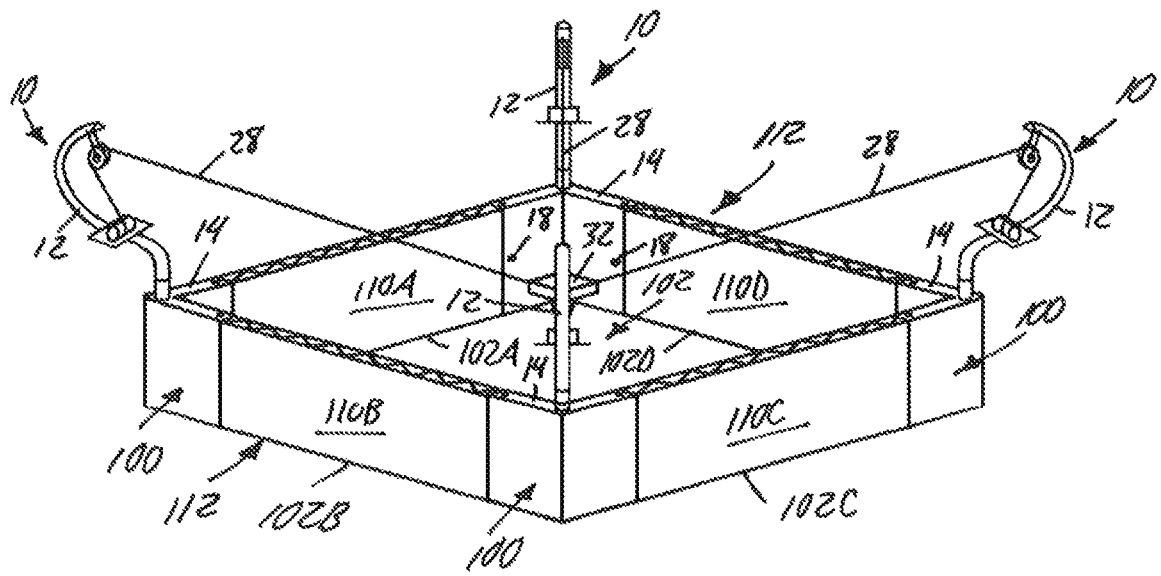
FIG. 4A is another perspective view of the four cable-support masts of FIG. 2A after 3D printed completion of the first-level perimeter wall.

Such printing of an inter-corner wall section is repeated twice more, until four inter-corner wall sections 110A, 110B, 110C, 110D have been respectively printed along the four sides 102A, 102B, 102C, 102D of the first-level footprint area 102 at the originally open spaces between the four corner wall-sections 100, whereby the finished inter-corner wall sections cooperate therewith to form a full first-level perimeter wall structure 112 spanning around the entire first-level footprint area 102, as shown in FIG. 4A. It will be appreciated that the use of the 3D printing system need not be limited only to printing of outer perimeter walls of the building or structure, and may also be used to 3D print other concrete components of the building within the footprint area 102. Once this 3D printed completion of the first-level perimeter wall (and optional 3D printing of other concrete features of the building's first level) is finished (as shown in FIG. 4A), the four cable support masts 10 are then removed from their installed positions atop the corner wall-sections 100 of the first-level perimeter wall. Such removal may entail removal or loosening of the fasteners 18 in order to unfasten the void-received anchor members 16 of the masts 10 from the corner wall-sections 100, followed by lifting the mast poles 12 and bases 14 from atop the corner wall-sections 100 to extract the unfastened anchor members 16 from the void cavities of the corner wall-sections 100. With printed completion of the first-level perimeter wall 112 complete, and once the concrete has set, ceiling/floor structure for dividing the interior spaces of the first and second levels of the building may installed on the completed first-level structure 112 before proceeding with construction of the second level of the building.

Figure 4B:
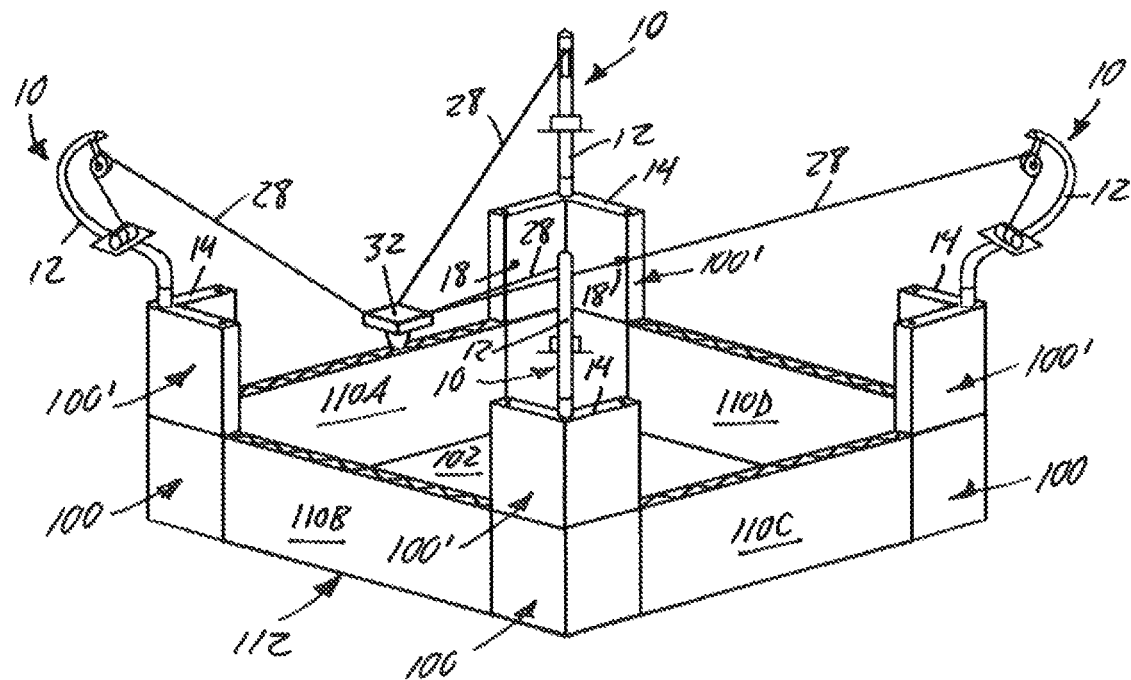
FIG. 4B is another perspective view of the four cable-support masts of FIG. 4A, but having been removed from the completed first-level perimeter wall, and now installed upon four initially erected corner wall-sections of an incomplete second-level perimeter wall of the building for 3D printed completion thereof atop the previously completed first-level structure.

FIG. 4B illustrates the beginning of such second-level construction, but omits the aforementioned floor/ceiling structure first-level ceiling/second level floor structure for illustrative purpose. Here, the same general procedure followed during the prior first-level construction stage is substantially repeated for the second-level construction stage, by first erecting a set of four second-level corner wall-sections 110' atop the completed first-level structure 112, and then installing the four cable support masts 10 atop these second-level corner wall-sections 110'. Particularly for the second and any subsequent levels of the building, where gantry-based 3D printing of corner wall-sections may not be possible in the manner contemplated above for the first ground level of the building, particularly due to lack of surrounding ground/floor surface around the corner areas of the second and subsequent levels, the corner wall-sections 110' may instead be prefabricated elsewhere from their intended positions at the corners of the footprint area, whether on-site or off-site, and then moved into place and anchored to the underlying structure of the previously constructed level at the corners of the footprint area of the current level being constructed. As another alternative, the corner wall-sections of the second and any subsequent level may be cast-in place at the corners of the footprint area using concrete forms specifically at the corners, while still benefiting from the efficiencies of formless 3D printing of the more substantial inter-corner sections of the perimeter wall being constructed. These same alternatives (prefabricated or cast-in-place corner wall-sections) may likewise be used during the preceding construction of the first level, as an alternative to gantry-based 3D printing of the first-level corner wall-sections 100.

Figure 4C:
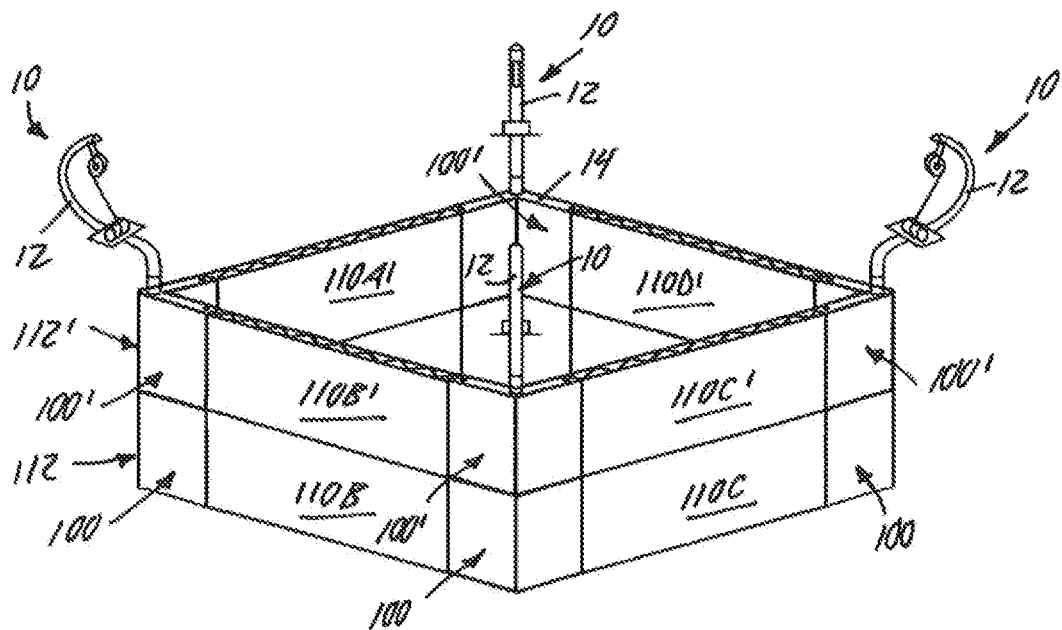
FIG. 4C is another perspective view of the four cable-support masts of FIG. 2B after 3D printed completion of the second-level perimeter wall.

Once the second level corner wall-sections 100' are in place, and the cable support masts 10 installed thereon, the concrete dispensing nozzle 32 is once again suspended by the positioning cables 28 of the cable support masts 10 in overlying the footprint area of the second level, which is of equal size and aligned relationship to the footprint area 102 of the first level in the illustrated example. Four inter-corner wall sections 110A', 110B', 110C', 110D' are again 3D printed, this time between the four second-level corner wall-sections 110' to form a complete second-level perimeter wall structure 112' atop the previously completed first-level structure 112, as shown in FIG. 4C. To print an additional third level, and any subsequent levels of the building, the same staging sequence is repeated: removing the masts 10 from the most recently completed level of the building, erecting initial corner wall-sections of a next level of the building, installing the cable support masts 10 on those initially erected corner wall-sections of the current level being added, and 3D printing the inter-corner wall sections of this current level. Such level-by-level building stages are repeated until all intended levels (as dictated by the building design) are complete.

Figure 5:
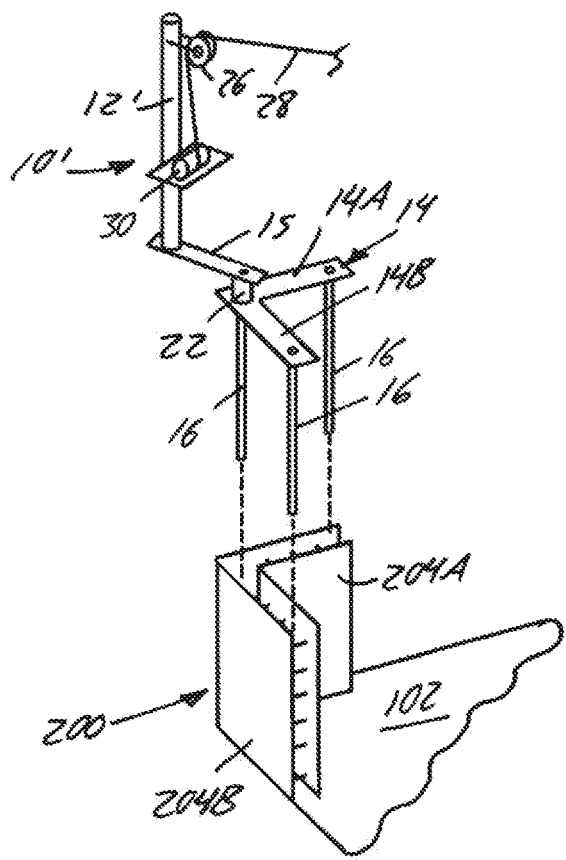
FIG. 5 illustrates a differently shaped variant of the cable support mast, and optional installation of the cable support mast on a concrete form rather than on a concrete corner wall-section.

As mentioned above, corner wall-sections of the perimeter walls that are being at least partially 3D printed may be cast concrete wall sections, rather than 3D printed wall sections. In such case, instead of mounting the cable support masts 10 to initially erected corner wall-sections, the cable support masts 10 may be mounted to corner-wall forms that, later on, after 3D printing of the inter-corner wall sections using the novel 3D printing system, are used in poured casting of the corner wall section in place between the 3D printed inter-corner wall sections. Such option is illustrated in FIG. 5, where a cable support mast 10' of similar character to those described above is being installed atop a corner-wall concrete form 200, with the hanging anchor members 16 of the mast base 14 again being inserted into hollow void spaces inside the concrete form between inner and outer form walls 204A, 204B thereof. Once again, the anchor members 16 may optionally be fastened in place through said form walls 204A, 20B. Alternatively, a temporary support for mounted placement of the cable support mast 10 thereon may be used for such purpose instead of a concrete corner wall-section or corner-wall form, and then subsequently removed after 3D printing of the inter-corner wall sections, whereupon such temporary supportive elements would be replaced with corner-wall forms for casting concrete corner wall-sections in place between the 3D printed inter-corner wall sections.

FIG. 5 also illustrates how the mast 10' need not necessarily rely on a curved mast post 12 in order to be supported in outwardly cantilevered relation of the base 14 in order to place the cable emergence pulley 26 or other emergence point of the positioning cable 28 suitably outward from the building's footprint. This is demonstrated in the figures by the illustrated example of a straight vertical mast post 12' on a cantilevered extension 15 that is coupled to, and spans outward from, the base 14. As shown, the cantilevered extension 15 may be mounted to the base via the aforementioned swivel 22, whereby the swivel axis 24 about which the post's orientation is adjustable is offset from the post 12' itself. In such example, instead of rotating about its own vertical axis, the straight post 12' is movable into different positions relative to the base on an arcing path, thus allowing adjustment of the mast post's position relative to the corner of the footprint area 102.

In yet another alternative, the masts 10 may be made tall enough that, rather than being placed atop initially erected corner wall-sections, corner-wall forms, or temporary supports that reside at the same level whose perimeter wall is being at least partially printed with the novel 3D printing system, the masts are instead anchored to the ground or foundation, in the case of the first-level construction, or to a last constructed level that resides immediately beneath the current level being constructed. The inter-corner wall sections of the current level are then 3D printed using the masts 10, followed by subsequent in-fill of the corner wall-sections after removal of the masts, for example using corner-wall forms and poured concrete. Regardless of the particular support to which the masts 10 are removably mounted for temporary use at the given level under construction, novelty exists in that, for the second and any subsequent levels, the masts are being supported not at ground level, but rather by the previously constructed level(s) of the building currently under construction.

It will be appreciated that the illustrated embodiment with a respective singular positioning cable 28 per mast 10, a singular pulley 26 per mast 10 over which that singular positioning cable 28 is routed at a predefined and fixed cable emergence point on the mast, and a singular motorized cable winder 30 per mast that operates the singular positioning cable 28 thereof is merely one non-limiting example. One example of a possible variant is one that instead employs multiple cables, multiple pulleys and multiple winders per mast, optionally with one of said pulleys mounted on a movable carriage displaceable along the mast to enable elevational adjustment the cable-emergence point at which the respective control cable 28 emerges from its respective pulley toward the nozzle 32, as disclosed in aforementioned U.S. Pat. No. 11,254,027, the entirety of which is incorporated herein by reference.

Since various modifications can be made in my invention as herein above described, and many apparently widely different embodiments of same made, it is intended that all matter contained in the accompanying specification shall be interpreted as illustrative only and not in a limiting sense.

The invention claimed is:

1. A method of building a multi-level structure at least partly by way of three-dimensional (3D) printing using a cable-guided nozzle, said method comprising gradually constructing said multi-level structure level-by-level in a plurality of stages, during which at least one stage comprises building an additional level of said structure atop one or more previously built levels of said structure by:
   (a) installing cable support masts in a manner supported on the one or more previously built levels of said structure, and in positions where cable-emergence points of the cable support masts reside outwardly of a two-dimensional footprint to be occupied by the additional level, wherein each one of the cable support masts is accompanied by a respective motorized cable winder having a respective positioning cable wound thereon by which said positioning cable is windable and unwindable to shorten and lengthen a reach of said respective positioning cable from the cable-emergence point of said one of the support masts, from which the respective positioning cable runs to the nozzle and is connected thereto for both cable-suspended support thereof and cable-controlled movement thereof via operation of said respective motorized cable winder; and
   (b) with said cable-guided nozzle both suspended by the respective positioning cables of the cable support masts and movingly controllable by operation of the respective motorized cable winders of the cable support masts, 3D printing at least part of said current level of the structure onto said one or more previously built levels using said cable-guided nozzle during cable-controlled movement thereof performed by operation of the respective motorized cable winders to reposition the cable-guided nozzle via said respective positioning cables.

2. The method of claim 1 wherein step (a) comprises installing said cable support masts at corners of said two-dimensional footprint.

3. The method of claim 1 wherein step (a) comprises installing said cable support masts on initially-erected wall sections of a perimeter wall of the additional level, and step (b) comprises subsequently 3D printing additional wall sections of said perimeter wall.

4. The method of claim 3 wherein said initially-erected wall sections of the perimeter wall in step (a) are corner wall-sections of said perimeter wall, and the additional wall sections subsequently printed in step (b) comprise inter-corner sections of said perimeter wall that span between said initially-erected corner wall-sections.

5. The method of claim 1 wherein step (a) comprises installing said cable support masts on initially-erected hollow wall forms for intended later casting of partial sections of an intended perimeter wall for the additional level, and step (b) comprises subsequently 3D printing other wall sections of said intended perimeter wall at locations outside said initially-erected hollow wall forms.

6. The method of claim 5 wherein said initially-erected hollow wall forms in step (a) are corner wall-forms, and the other wall sections printed in step (b) comprise inter-corner sections of said perimeter wall that span between said initially-erected corner wall-forms.

7. The method of claim 1 wherein said one or more previously built levels include a first level, and the method comprises, prior to building of said additional level atop of said one or more previously built levels, first building said first level by:
   (i) installing said cable support masts at corners of a two-dimensional first-level footprint to be occupied by the first level, and in positions where the cable-emergence points of the cable support masts reside outwardly of said two-dimensional first-level footprint; and
   (ii) with said cable-guided nozzle suspended by the respective positioning cables spanning from the cable support masts installed at said corners of the two-dimensional first-level footprint, 3D printing at least part of said first level of the multi-level structure.

8. The method of claim 1 wherein said one or more previously built levels include a first level, and the method comprises, prior to building of said additional level atop of said one or more previously built levels, first building said first level by:
   installing said cable support masts on initially-erected wall sections of a first-level perimeter wall belonging to said first level, and in positions where the cable-emergence points of the masts reside outwardly of a two-dimensional first-level footprint to be occupied by the first level; and with said cable-guided nozzle suspended by the respective positioning cables spanning from the cable support masts supported on said initially-erected wall sections of the first-level perimeter wall, subsequently 3D printing additional wall sections of said first-level perimeter wall.

9. The method of claim 8 wherein said initially-erected wall sections of the first-level perimeter wall are corner wall-sections thereof, and the additional wall sections of said first-level perimeter wall comprise inter-corner sections of said first-level perimeter wall that span between said initially-erected corner wall-sections of said first-level perimeter wall.

10. The method of claim 1 wherein said one or more previously built levels include a first level, and the method comprises, prior to building of said additional level atop of said one or more previously built levels, first building said first level by:

installing said cable support masts on initially-erected hollow wall forms for intended later casting of partial sections of an intended first-level perimeter wall for said first level, and in positions where the cable-emergence points of the cable support masts reside outwardly of a two-dimensional first-level footprint to be occupied by the first level; and with said cable-guided nozzle suspended by the respective positioning cables spanning from the cable support masts supported on said initially-erected hollow wall forms for the intended first-level perimeter wall, subsequently 3D printing other wall sections of said intended first-level perimeter wall outside said initially-erected hollow wall forms.

11. The method of claim 10 wherein said initially-erected hollow wall forms for the intended first-level perimeter wall are first-level corner wall-forms, and the other wall sections of said intended first-level perimeter wall comprise inter-corner sections of said first-level perimeter wall that span between said initially-erected corner wall-forms of said intended first-level perimeter wall.

12. The method of claim 1 wherein the cable support masts are supported in an outwardly cantilevered relation from the two-dimensional footprint in step (a).

13. The method of claim 1 wherein the cable support masts are each carried by a respective base each installed in seated placement atop a hollow wall component of the structure, from which one or more anchor members depend downwardly from said base one or more hollow cavities of said hollow wall component of the structure.

14. The method of claim 13 wherein installation of each support mast comprises securement thereof to said hollow wall component of the structure by fastening of said anchor members thereto.

15. The method of claim 1 wherein each support mast is supported by a respective swivel having a respective upright swivel axis about which the support mast is angularly adjustable in position or orientation.

16. The method of claim 1 wherein step (a) comprises installing the cable support masts in positions seated atop wall componentry the structure.

17. The method of claim 16 wherein said wall componentry comprises hollow wall forms for casted wall sections of the structure, between which other wall sections are 3D printed in step (b).

18. The method of claim 16 wherein said wall componentry comprises previously-cast wall sections of the structure, between which other wall sections are 3D printed in step (b).

19. The method of claim 16 wherein said wall componentry comprises prefabricated wall sections, between which inter-wall sections are 3D printed in step (b).

20. The method of claim 1 comprising, after 3D printing said at least part of said current level of the structure, uninstalling the cable support masts from the structure, and after completion of current level of the structure, reinstalling the cable supports at a higher elevation on the structure than originally installed in step (a) in order to 3D print a subsequent level of the structure.

* * * * *